United States Patent
Zhang

(10) Patent No.: US 8,409,742 B2
(45) Date of Patent: Apr. 2, 2013

(54) ELECTRONIC DEVICE AND BATTERY LOCKING MECHANISM THEREOF

(75) Inventor: Shuai Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 296 days.

(21) Appl. No.: 12/952,215

(22) Filed: Nov. 23, 2010

(65) Prior Publication Data

US 2012/0052357 A1    Mar. 1, 2012

(30) Foreign Application Priority Data

Aug. 24, 2010  (CN) .......................... 2010 1 0261596

(51) Int. Cl.
*H01M 2/10* (2006.01)
(52) U.S. Cl. .................... 429/100; 429/122; 429/123
(58) Field of Classification Search .............. 429/100, 429/122; D13/103, 107, 119; 396/277, 539; 292/95, 109–115
See application file for complete search history.

(56) References Cited

U.S. PATENT DOCUMENTS

| | | | | |
|---|---|---|---|---|
| 5,502,366 A | * | 3/1996 | Lee | 348/372 |
| 5,824,431 A | * | 10/1998 | Tsurumaru et al. | 429/97 |
| 7,989,101 B2 | * | 8/2011 | Hara et al. | 429/96 |
| 2005/0184702 A1 | * | 8/2005 | Suzuki et al. | 320/107 |
| 2009/0179435 A1 | * | 7/2009 | Lev et al. | 292/164 |
| 2010/0086840 A1 | * | 4/2010 | Shao | 429/97 |
| 2011/0177386 A1 | * | 7/2011 | Tada | 429/176 |

FOREIGN PATENT DOCUMENTS

| | | | |
|---|---|---|---|
| JP | 09330687 A | * | 12/1997 |
| JP | 10144274 A | * | 5/1998 |
| JP | 2002373632 A | * | 12/2002 |

* cited by examiner

*Primary Examiner* — Gregg Cantelmo
(74) *Attorney, Agent, or Firm* — Altis Law Group, Inc.

(57) ABSTRACT

The present disclosure provides an electronic device using a battery locking mechanism. The electronic device includes a main body defining a receiving space to receive a battery. A battery locking mechanism mounted in the receiving space includes a sliding member and a rotatable member rotatably connected with each other through a connection portion. The sliding member includes a elastic member and a sliding bar, the rotatable member includes a through hole in a position between its two opposite ends and a hook formed at its free end, a shaft extends from the bottom surface of the receiving space extending through the through hole, allowing the rotatable member to rotate about the shaft. A battery locking mechanism applied in an electronic device is also provided.

8 Claims, 2 Drawing Sheets

ELECTRONIC DEVICE AND BATTERY LOCKING MECHANISM THEREOF

BACKGROUND

1. Technical Field

The present disclosure relates to electronic devices and battery locking mechanism and, particularly, to an electronic device using a battery locking mechanism.

2. Description of Related Art

A conventional battery locking mechanism in an electronic device includes a number of spring contacts which can be compressed into the body of electronic devices.

When mounting a battery in the electronic device, the battery compresses the contacts. The spring contacts apply a spring force to the battery and locks the battery in position. One problem with this type of battery locking mechanism is that the battery is easily disengaged from the electronic device.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
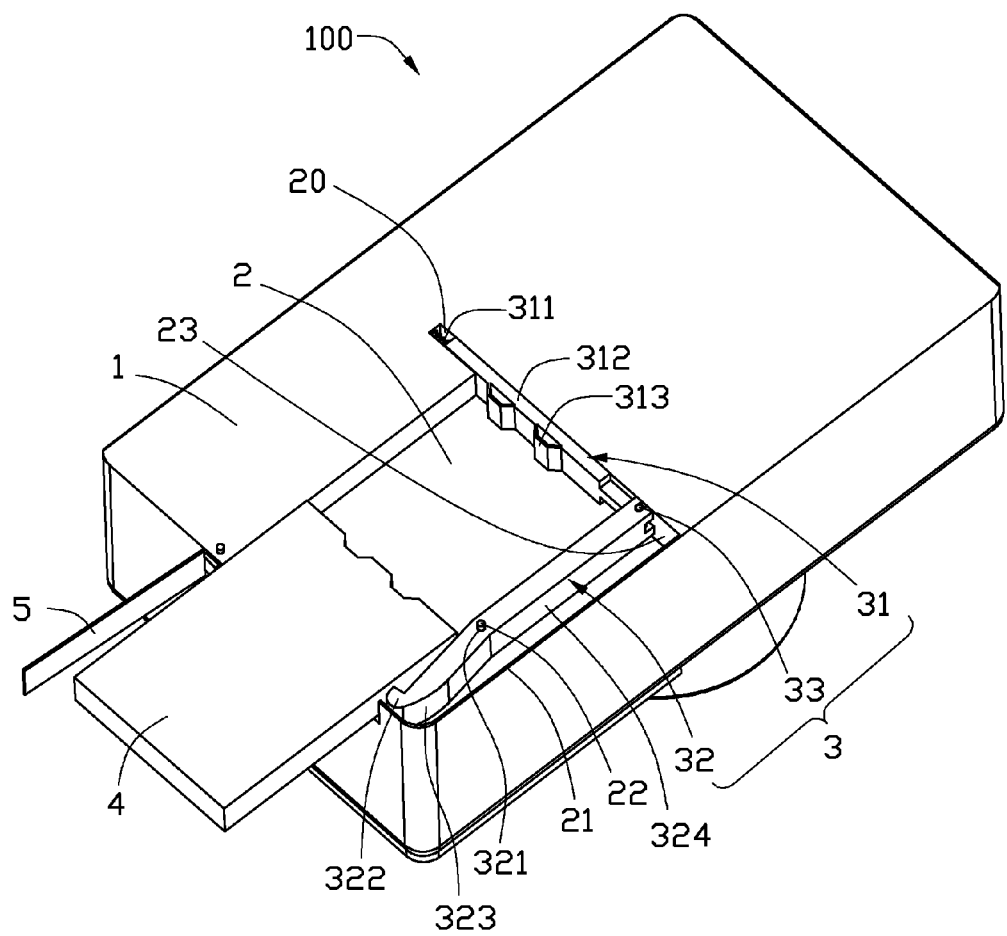
FIG. 1 is an isometric view of an electronic device with a battery locking mechanism in accordance with an exemplary embodiment, showing the locking mechanism in a free state.

Referring to FIG. 1, an electronic device 100 includes a main body 1 defining a receiving space 2, a battery locking mechanism 3, a battery 4, and a cover 5. The battery locking mechanism 3 is mounted in the receiving space 2 and used to lock the battery 4 in the receiving space 2.

In this embodiment, the receiving space 2 is an open-ended cavity defined in the main body 1 and receives the battery 4. The cover 5 covers the open end of the receiving space 2 to protect the battery 4 received in the receiving space 2. The main body 1 further defines a slot 20 extending from a sidewall 23 of the receiving space 2.

The battery locking mechanism 3 includes a sliding member 31, a rotatable member 32, and a connection portion 33. The sliding member 31 includes an elastic member 311, a sliding bar 312, and a number of contacts 313 protruding from the sliding bar 312 into the receiving space 2. In this embodiment, the elastic member 311 is a coil spring. The elastic member 311 is fixed to the main body 1 and arranged within the slot 20. The elastic member 311 is used to apply a spring force to the sliding bar 312. The sliding bar 312 is slidably connected to the sidewall of the receiving space 2. One end of the sliding bar 312, which is connected with the elastic member 311, is received in the slot 20. The contacts 313 are used to contact the corresponding contacts (not shown) on the battery 4, to make an electrical connection between the electronic components of the electronic device 100 and the battery 4.

One end of the rotatable member 32 is rotatably connected to the end of the sliding bar 312 away from the elastic member 311 through the connecting portion 33. The rotatable member 32 further defines a through hole 321 in a position between its opposite ends, and a hook 322 formed at its free end. In this embodiment, the rotatable member 32 includes a first portion 323 and a second portion 324, which connect with each other at a connection point (not labeled), and the first portion 323 extends away toward a direction away from the slot 20 such that a certain angle is formed between the first portion 323 and the second portion 324, and the through hole 321 is set on the connection point. A shaft 22 extends from the bottom surface of the receiving space 2 extending through the through hole 321, allowing the rotatable member 32 to rotate about the shaft 22. When the rotatable member 32 rotates about the shaft 22, the sliding member 31 is driven to slide along the slot 20. The hook 322 is employed to latch the battery 4.

Before installing the battery 4 in the receiving space 2, the elastic member 311 is in a free state. The elastic member 311 pushes the sliding member 312 to a position adjacent to a sidewall 21 opposite to the slot 20 and the hook 322 away from the sidewall 21. The distance between the hook 322 and the sidewall, which is opposite to the sidewall 21, is less then the width of the battery 4.

Figure 2:
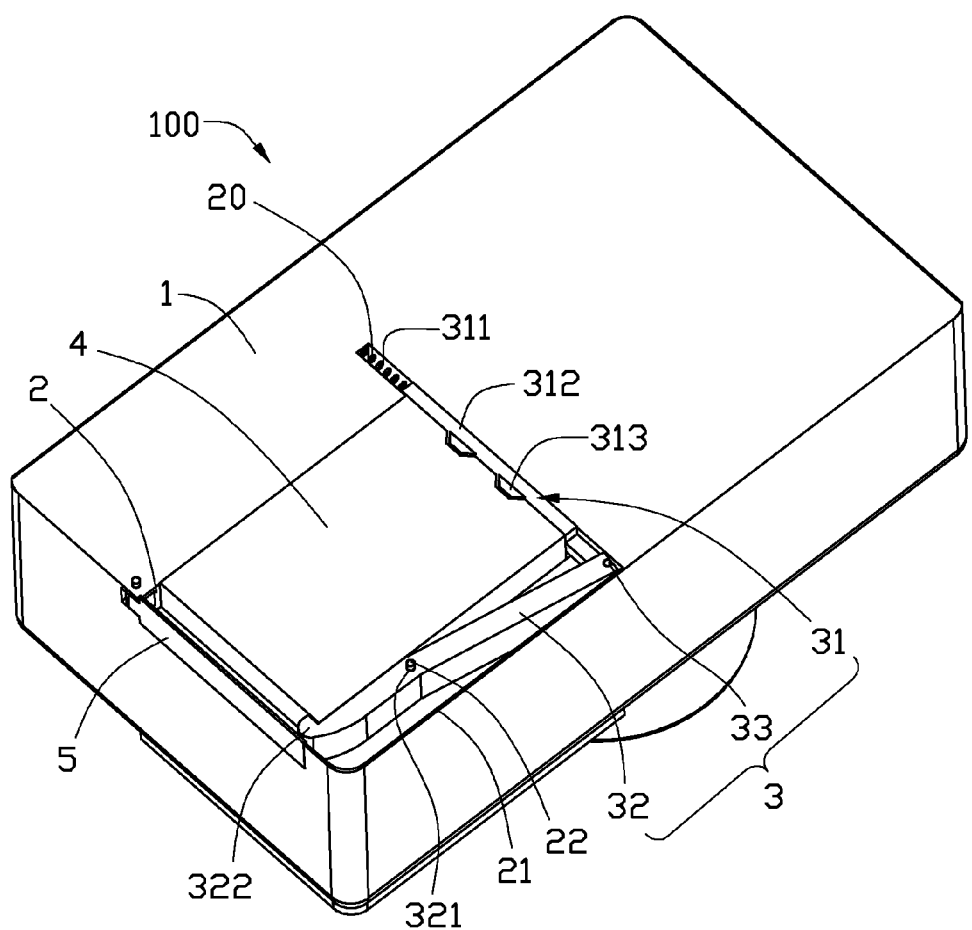
FIG. 2 is an isometric view of the electronic device of FIG. 1, showing that a battery is locked by the locking mechanism.

When installing the battery 4 in the receiving space 2, the hook 322 is pushed by the battery 4 to move toward the sidewall 21, causing the rotatable member 32 to rotate about the shaft 22. The sliding bar 31 then slides toward the slot 20, compressing the elastic member 311. Referring to FIG. 2, after one end of the battery 4 engages the hook 322 and the opposite end of the battery 4 resists against the sliding bar 312, the battery 4 is retained within the receiving space 2.

To take the battery 4 out from the receiving space 2, the hook 322 can be pushed toward the sidewall 21 to free the battery 4 from the limitation of the hook 322. Simultaneously, the sliding bar 312 is caused to slide toward the slot 20, causing the contacts 313 to push the battery 4 out.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a main body defining a receiving space to receive a battery, the receiving space comprising a bottom comprising a shaft protruding therefrom; and
   a battery locking mechanism mounted in the receiving space and comprising:
   a sliding member comprising an elastic member fixed to the main body and a sliding bar slidably connected to the main body, wherein the sliding member further comprises a plurality of contacts protruding from the sliding bar and configured to make an electrical connection between electronic components of the electronic device and the battery; and
   a rotatable member defining a through hole and with a hook formed at a first end thereof, rotatably connected to the sliding member at an opposite second end of the rotatable member, wherein the through hole is in a position between the opposite first and second ends of the rotatable member, the shaft extends through the through hole, allowing the rotatable member to rotate about the shaft;
   when mounting the battery in the receiving portion, the hook is pushed by the battery to move, causing the rotatable member rotates about the shaft, the sliding bar is driven by the rotatable member to slide, compressing the elastic member, after one end of the battery engages the hook and an opposite end of the battery resists against the sliding bar, the battery is retained within the receiving space.

2. The electronic device according to claim 1, wherein the receiving space further defines a slot extends from a sidewall of the receiving space; the elastic member and one end of the sliding bar, which is connected with the elastic member, are received in the slot.

3. The electronic device according to claim 2, wherein the elastic member is a coil spring.

4. The electronic device according to claim 2, wherein the rotatable member further comprises a first portion and a second portion, which connect with each other at a connection point, and the first portion extends away toward a direction away from the slot such that a certain angle is formed between the first portion and the second portion, and the through hole is set on the connection point.

5. A battery locking mechanism mounted in a battery receiving portion of an electronic device, the battery locking mechanism comprising:

a sliding member comprising an elastic member fixed to the main body and a sliding bar slidably connected to the main body, wherein the sliding member further comprises a plurality of contacts protruding from the sliding bar and configured to make an electrical connection between electronic components of the electronic device and the battery; and a rotatable member defining a through hole and with a hook formed at a first end thereof, rotatably connected to the sliding member at an opposite second end of the rotatable member, wherein the through hole is in a position between the opposite first and second ends of the rotatable member, the shaft extends through the through hole, allowing the rotatable member to rotate about the shaft;

when mounting the battery in the receiving portion, the hook is pushed by the battery to move, causing the rotatable member rotates about the shaft, the sliding bar is driven by the rotatable member to slide, compressing the elastic member, after one end of the battery engages the hook and an opposite end of the battery resists against the sliding bar, the battery is retained within the receiving space.

6. The battery locking mechanism according to claim 5, wherein the receiving space further defines a slot extends from a sidewall of the receiving space; the elastic member and one end of the sliding bar, which is connected with the elastic member, are received in the slot.

7. The battery locking mechanism according to claim 6, wherein the elastic member is a coil spring.

8. The electronic device according to claim 6, wherein the rotatable member further comprises a first portion and a second portion, which connect with each other at a connection point, and the first portion extends away toward a direction away from the slot such that a certain angle is formed between the first portion and the second portion, and the through hole is set on the connection point.

* * * * *